United States Patent

[11] 3,607,754

| [72] | Inventors | Mitsuo Asahina;<br>Haruko Kakutani; Kinuko Wada;<br>Masahiko Tamura, all of Tokyo, Japan |
|---|---|---|
| [21] | Appl. No. | 883,494 |
| [22] | Filed | Dec. 9, 1969 |
| [45] | Patented | Sept. 21, 1971 |
| [73] | Assignees | Kureha Kagaku Kogyo Kabushiki Kaisha<br>Tokyo, Japan;<br>Pioneer Electronic Corporation<br>Tokyo, Japan |
| [32] | Priority | Dec. 9, 1968 |
| [33] | | Japan |
| [31] | | 43/89522 |

[54] HIGH MOLECULAR WEIGHT ELECTRETS AND PROCESS FOR PRODUCING THEM
6 Claims, 2 Drawing Figs.

[52] U.S. Cl. .................................................. 252/63.2,
29/592, 161/411, 307/88

[51] Int. Cl. .................................................. H01b 3/18
[50] Field of Search .......................................... 252/63.2;
161/411; 307/88 ET; 317/262; 264/27; 204/165;
29/592; 260/900

[56] References Cited
UNITED STATES PATENTS
3,316,620  5/1967  Stewart ....................... 161/411 X

*Primary Examiner*—John T. Goolkasian
*Assistant Examiner*—Lorraine T. Kendell
*Attorney*—Sughrue, Rothwell, Mion, Zinn & Macpeak ABSTRACT: An electret comprising a resin mixture of from 50 to 90 percent by weight of a vinylidene fluoride resin and from 10 to 50 percent by weight of a methyl methacrylate resin, said resin mixture having been subjected to polarization.

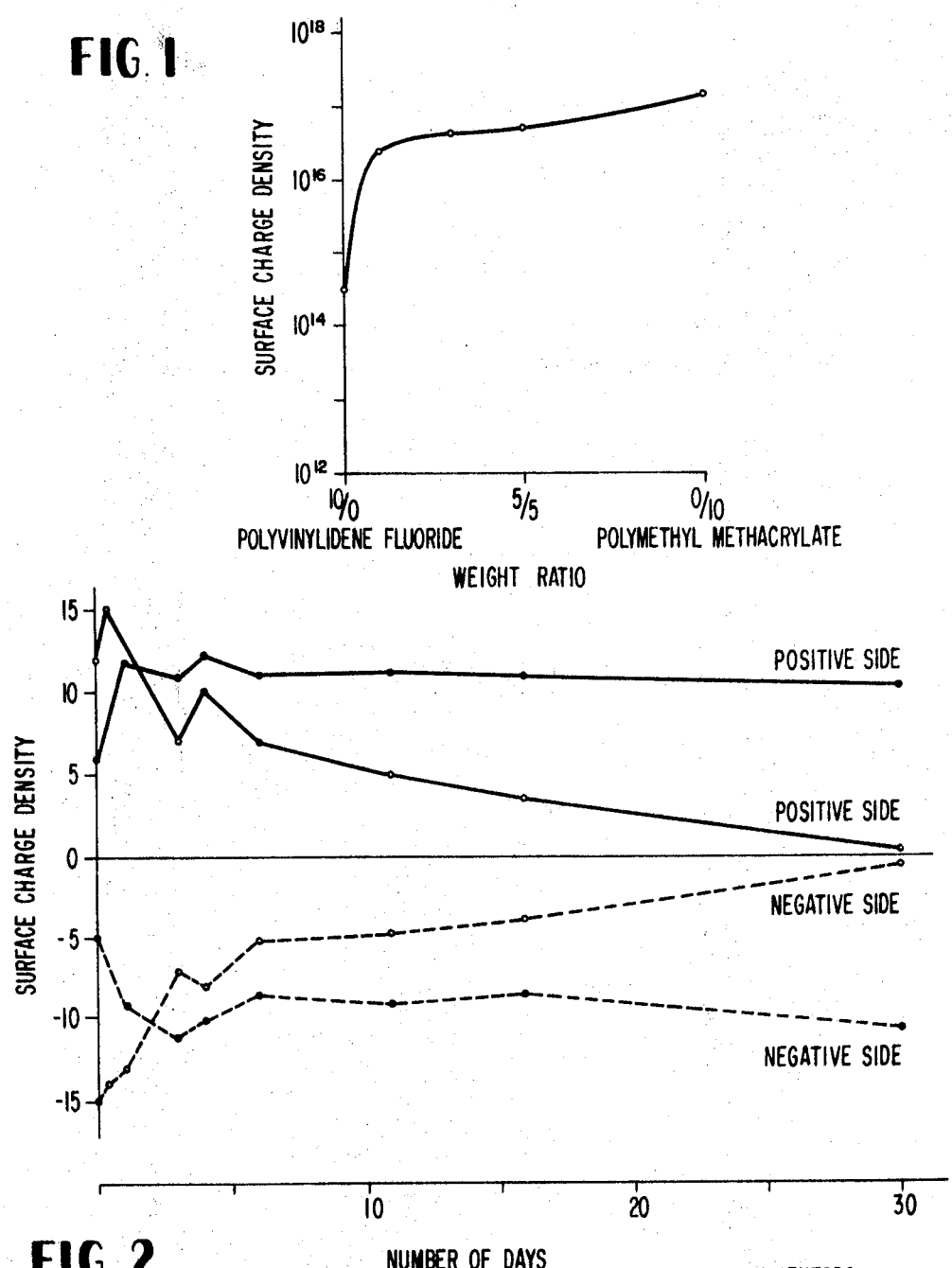

HIGH MOLECULAR WEIGHT ELECTRETS AND PROCESS FOR PRODUCING THEM

BACKGROUND OF THE INVENTION

1. Field of the Invention

The present invention relates to a stable electret and a process for the production of the same.

2. Description of the Prior Art

It is well known that if a high direct current potential is applied to an article composed of a vinylidene fluoride resin at a suitable temperature and the article is cooled in that state, the article maintains its polarized state or shows a so-called electret phenomenon. Other polar, high molecular weight compounds such as polyethylene terephthalate, polycarbonate resins and the like, also function in the same manner.

Vinylidene fluoride resin is particularly interesting as a material for producing an electret since a vinylidene fluoride resin has a higher polarizability than other polar high molecular weight materials, and hence the resin can readily provide an electret having a high density of electric charge. However, since the electric insulating property of vinylidene fluoride resin is comparatively low, e.g., $10^{14}$ ohm-cm. (volume specific resistance) as compared with other materials used to produce electrets, and, in addition, the glass transition point of the resin is lower than normal temperature, the electret prepared by using vinylidene fluoride resin does not always sufficiently maintain electric charges.

Thus, a principal object of the present invention is to provide an improved electret and a process for producing an electret having a high surface charge density and excellent maintenance of electric charges.

SUMMARY OF THE INVENTION

The object of the present invention can be achieved by using a mixture of a vinylidene fluoride resin and a methyl methacrylate resin according to the present invention.

BRIEF DESCRIPTION OF THE DRAWINGS

FIG. 1 illustrates the change in surface charge density according to a corresponding change in weight ratios of the vinylidene fluoride and methyl methacrylate resins.

FIG. 2 compares the variation in surface charge density of an electret of the present invention with that of a conventional electret.

DETAILED DESCRIPTION OF THE PREFERRED EMBODIMENTS

It is well known that a vinylidene fluoride resin is highly miscible with a methyl methacrylate resin. In the present invention, by mixing a comparatively small amount of a methyl methacrylate resin with a vinylidene fluoride resin, the molecular kinetic property of the vinylidene fluoride resin, occurring at a low temperature, is controlled and he electric insulating property of the resin is extremely increased as shown in FIG. 1 of the accompanying drawings.

The electret in the present invention may be produced from the resin mixture mentioned above by conventional methods, e.g., by forming a plate or film of the resin mixture and polarizing the article. A good result is obtained when the polarization procedure is conducted at a temperature of from 80° to 160° C. but the most preferably result is obtained by polarizing the article at a temperature of from 100° to 135° C.

Referring to FIG. 2 of the accompanying drawings, the characteristic variation of the surface charge density of an electret made of a plate of a mixture of 70 parts by weight of a vinylidene fluoride resin and 30 parts by weight of a methyl methacrylate resin having a thickness of about 1 mm., is shown by the points designated (.), while the characteristics o an electret made of a plate of vinylidene fluoride resin having the same thickness as above is shown by the points designed (o). The figure shows that the electret made of the resin mixture of the present invention has excellent properties in comparison with the conventional electret.

The aforesaid characteristics of the surface charge density of the electret made of the resin mixture of the present invention are scarcely influenced by temperatures in the range of from room temperature to about 60° C. That is, the fast decay property of the electret made of the vinylidene fluoride resin alone can be improved by the addition of a small proportions of a methyl methacrylate resin.

Moreover, the relationship of the mixing ratio of the two components and the surface charge density of the electret made of the resin mixture of the present invention and the charge decay characteristics of electrets have been studied, and it has been discovered that good results are obtained when the weight ratio of vinylidene fluoride resin to methyl methacrylate resin is from 9/1 to 5/5. Electrets having satisfactory properties cannot be obtained when mixing ratios other than the above range are employed.

Useful vinylidene fluoride resins of the present invention include, besides polyvinylidene fluoride, copolymers containing more than 70% polyvinylidene fluoride and a monomer copolymerizable with vinylidene fluoride, such as vinyl fluoride, ethylene trifluoride, ethylene tetrafluoride, and the like.

Useful methyl methacrylate resins of the present invention are high molecular weight homopolymers of methyl methacrylate and copolymer of methyl methacrylate and less than 25 mole% of a monomer polymerizable with methyl methacrylate, such as an alkyl methacrylate (e.g., ethyl methacrylate, propyl methacrylate, butyl methacrylate and octyl methacrylate), styrene, α-methylstyrene, acrylonitrile and alkyl acrylate.

The composition for producing the electret in the present invention may of course be mixed with various additives used in the production of electrets, such as stabilizers, an inorganic electrolyte, and an organic electrolyte.

The invention will be further explained by reference to the following nonlimiting examples.

EXAMPLE 1

A mixture of a vinylidene fluoride resin obtained by suspension polymerization and a commercially available granular methyl methacrylate resin in a weight ratio of 7/3 was kneaded by means of a roll kneader at 160–190° C. and then press molded into a plate 970 microns thickness at 190° C. The plate was inserted between electrodes and a direct current potential of 50 kv./cm. was applied to the electrodes for 1.5 hours at 120° C. Thereafter, the plate was cooled to room temperature over a 1 hour period and the electric field was then removed.

The variation of the surface charge density of the electret thus prepared is shown in FIG. 2 by the points designated (.). As shown in the figure, the surface charge density of the electret after 1 day was 12 e.s.u. (electrostatic units)/sq. cm. at the positive side and −9 e.s.u./sq. cm. at the negative side, and even after 1 month, the surface charge density was 10 e.s.u./sq. cm. at the positive side and −10 e.s.u./sq. cm. at the negative side, which showed that almost no charge decay occurred.

EXAMPLE 2

The same procedure of Example 1 was followed with the exception that a copolymer of 90% methyl methacrylate and 10% ethyl methacrylate was employed instead of the methyl methacrylate resin. The results are as follows: the surface charge density of the electret was 14.5 e.s.u./sq. cm. at the positive side and −14 e.s.u./sq. cm. at the negative side after 1 day; 14 e.s.u./sq. cm. at the positive side and −14 e.s.u./sq. cm. at the negative side after 1 month, which showed that the surface charge density was scarcely decayed.

What we claim is:

1. An electret comprising a resin mixture of from 50 to 90% by weight of a vinylidene fluoride resin and from 10 to 50% by weight of a methyl methacrylate resin, said resin mixture having been subjected to polarization.

2. The electret as in claim 1 wherein said vinylidene fluoride resin is selected from the group consisting of polyvinylidene fluoride and a copolymer containing more than 70% by weight polyvinylidene fluoride.

3. The electret as in claim 2 wherein said copolymer is a copolymer of vinylidene fluoride and a member selected from the group consisting of vinyl fluoride, ethylene trifluoride, and ethylene tetrafluoride.

4. The electret as in claim 1 wherein said methyl methacrylate resin is selected from the group consisting of homopolymer of methyl methacrylate and a copolymer of methyl methacrylate and less than 25 mole% of a monomer selected from the group consisting of an alkyl methacrylate, styrene, $\alpha$-methylstyrene, acrylonitrile and alkyl acrylate.

5. The electret as in claim 1 wherein said polarization is conducted by applying a direct current potential to said resin mixture at a temperature of from 80 to 160° C., followed by cooling the mixture.

6. The electret as in claim 1 wherein said polarization is conducted by applying a direct current potential to said resin at a temperature of from 100 to 135° C.